Jan. 11, 1966  W. GOMULKA  3,229,243
ELECTRICAL CONNECTOR
Filed April 30, 1963
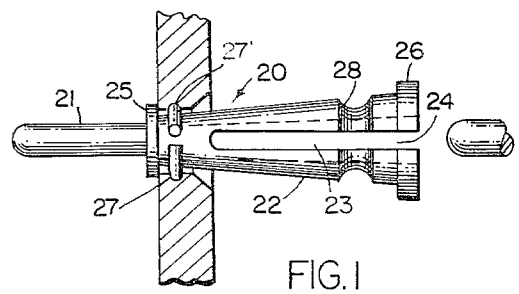
FIG.1
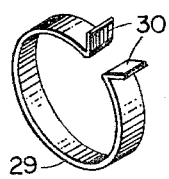
FIG.2
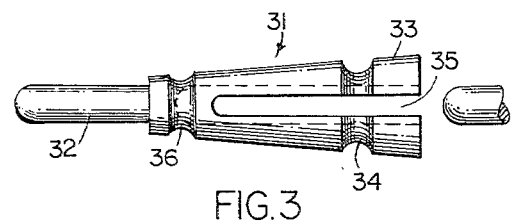
FIG.3   FIG.10
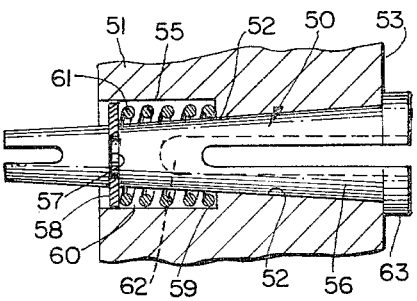
FIG.5
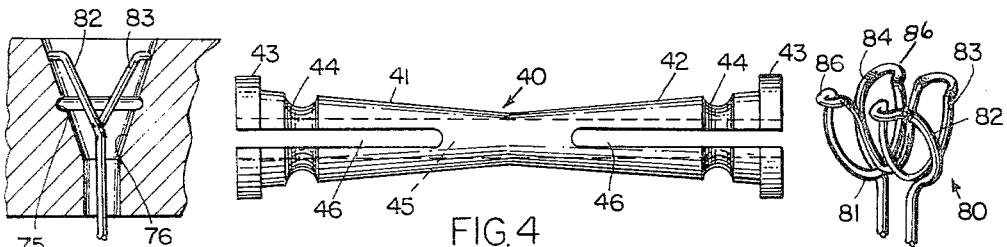
FIG.6   FIG.7   FIG.4   FIG.8   FIG.9   FIG.11
FIG.12   FIG.13   FIG.14   FIG.15
INVENTOR.
William Gomulka
BY
Ezekiel Wolf, Wolf + Greenfield
ATTORNEYS

United States Patent Office 3,229,243
Patented Jan. 11, 1966

3,229,243
ELECTRICAL CONNECTOR
William Gomulka, 149 Ormond St., Mattapan, Mass.
Filed Apr. 30, 1963, Ser. No. 276,762
2 Claims. (Cl. 339—215)

The present invention relates to electrical coupling devices and more particularly to coupling devices, adapted to interconnect cables and other conductors.

It is an object of the present invention to provide a coupling device adapted to connect electrical conductors wherein the coupling device is designed and constructed so that matable or interengageable parts may be locked together in a positive manner, but nonetheless in a manner capable of relatively quick manual release.

It is another object of the present invention to provide a quick release type of electrical connector in which the electrically matable parts when interengaged form a continuous electrical connection over a substantial area with a positive pressure exerted to maintain the two parts together.

A further object of the present invention is to provide a connector which may be used to support and interengage various components and in which the matable parts may be shaped for various applications.

Yet another object of the present invention is to provide a coupling device wherein matable or interengageable parts may be coupled together or disengaged by relatively simple straight line friction-free movement of one part relative to the other.

Yet another object of the present invention is to provide an electrical coupling device which may readily be miniaturized and which is capable of withstanding severe mechanical strains, stresses and vibrations without harmful effects.

To accomplish the stated and other objects, this invention includes among its features a connector having male and female sections. In several embodiments of this invention a single connector body is provided with integral male and female sections so that the bodies may be used interchangeably. In many embodiments of this invention the female section of the electrical connector is supported for longitudinal movement between a locking and released position in a static base having an opening provided therein which conforms generally in shape to the outer surface of the female section. Means are provided in the female section which enable other cooperating parts to compress the female section so as to lock the male probe within it.

These and other objects and features of the present invention along with its incident advantages will be better understood and appreciated when considered in conjunction with the accompanying drawings which illustrate several embodiments thereof and in which:

FIG. 1 is a perspective view of one embodiment of this invention;

FIG. 2 is a perspective view of a detail of a modification of the embodiment of FIG. 1;

FIG. 3 is a side view of another embodiment of this invention;

FIG. 4 is a side view of a double ended female connector comprising another embodiment of this invention;

FIG. 5 is a side view of still another embodiment of this invention;

FIG. 6 is a perspective view of another modification of this invention;

FIG. 7 is a side view of the embodiment shown in FIG. 6;

FIGS. 8 and 9 are perspective views of additional embodiments of this invention;

FIGS. 10 and 11 are side views of the embodiments shown in FIGS. 8 and 9;

FIG. 12 is a side view of still another embodiment of this invention; and

FIGS. 13–15 are end views of other modifications of this invention.

In the embodiment of FIG. 1 the male and female parts of the electrical connector are integrated in a single unit 20 which halves the normal inventory requirements when each portion of the connector is separately fabricated. Thus the body 20 includes a male probe 21 and a receptacle 22, and the receptacle is adapted to receive a probe of another connector identical to the probe 21. The receptacle end 22 is frusto-conical in shape and is provided with one or more slits 23 radially arranged thereby cleaving the body, preferably into quadrants. The walls forming the slits 23 permit the squeezing of the side walls of the body so as to decrease the diameter of the recess 24 of the receptacle end 22, which receives the male probe 21.

A pair of flanges 25 and 26 define the limits of the female receptacle 22 and may serve as stops when the body 20 is mounted in a fixed panel. A split ring 27 is shown in FIG. 1 to be disposed adjacent the flange 25 and surrounding the smaller end of the receptacle 22. The split ring 27 may be made of a spring material that serves to compress the side walls of the receptacle 22 to reduce the diameter of the recess 24 when the spring is positioned in the annular groove 28 formed in the body adjacent the flange 26 at the wider end of the receptacle. When the receptacle is not permanently mounted in a static panel provided with a keeper for retaining the ring 27 in a fixed position, the flanges 25 and 26 may serve to retain the ring on the body. In FIG. 1 the split ring 27 remains stationary in the panel groove 27' and bears against the sides of the body to reduce the diameter of the recess 24 when the body is moved in a direction to align the groove 28 with the split ring 27 and the panel groove 27'. In this arrangement the ring 27 serves both as a locking device and as the bearing member to apply the restricting force upon the receptacle to reduce the diameter of the recess 24. When the body 20 is used free of any permanent mounting the ring 27 is merely slipped from the narrower end of the receptacle adjacent the flange 25 to the groove 28 when the diameter of the recess 24 is to be reduced so as to form an electrical connection with a probe.

The ring 27 may take many forms. For example, in the embodiment of FIG. 1 the ring is shown to be wirelike with a circular cross section. In FIG. 2 an equivalent ring 29 is shown made of a flat spring steel stock. This configuration is particularly desirable when the connector body 20 is used free of any permanent mounting in a static member. The flat spring steel body of the ring shown in FIG. 2 is provided with a pair of ears 30 that facilitate manual manipulation of the spring. Thus, the spring 29 of FIG. 2 may be somewhat more readily manipulated than the spring 27 to shift it from adjacent the flange 25 to the groove 28 in the body. Regardless of the shape of the spring employed it is desirable that the diameter of the body adjacent the flange 25 be less than the diameter of the body measured at any other location including the diameter at the groove 28. With this configuration the spring is not under any tension unless actually applying a squeezing force on the body to reduce the diameter of the recess 24, and as the spring is only subjected to tension when in the performance of its primary function its life in substantially increased.

The embodiment of this invention shown in FIG. 3 is very similar to that of FIG. 1. Thus, the body 31 is provided with a male probe 32 and a receptacle 33, and the receptacle 33 is provided with a groove 34 to retain a split ring or other form of spring to reduce the diameter of the central recess 35. The only physical difference between the embodiment of FIG. 3 and that of FIG. 1 is that the flanges at the extreme ends of the receptacle 33 are omitted. The absence of a flange comparable to the flange 25 at the smaller end of the receptacle makes it necessary to provide a keeper groove 36 adjacent the narrow end of the receptacle, and the groove 36 serves to retain the spring on the body when not positioned in the groove 34. The diameter of the groove 36 is substantially less than the diameter of the groove 34 so that the spring when not in use is free of any spring tension.

The embodiment of FIG. 4 is a double-ended female connector, each end of which is virtually identical to the female connector 22 of FIG. 1. Thus, the body 40 of the connector of FIG. 4 is composed of two female connectors 41 and 42, each provided with a flange 43 at its larger end and each bearing an annular groove 44 adjacent the larger end. A continuous recess 45 extends longitudinally through the entire body 40 although the single continuous recess may be replaced with two shorter recesses, one extending inwardly from each end of the body. Slots 46 are provided to enable each female receptacle to be compressed under the influence of a spring such as those shown at 27 and 29 in FIGS. 1 and 2. It is obviously unnecessary to provide any flanges at the smaller ends of the receptacles to serve as keepers for the springs because the two receptacles are connected at their narrower ends.

While the connector shown in FIG. 4 is provided with two female receptacles, each virtually identical to the female receptacle 22 in the embodiment of FIG. 1, it will be appreciated that the connector may be provided with as many receptacles as are required for a particular application, and a single integral unit could be composed of several female receptacles and the same or a different number of male probes. Though integrally formed the several receptacles may operate independently of one another and none is effected by the use or nonuse of the others.

The connector 50 shown in FIG. 5 is similar in shape to the connector of FIG. 1, and in FIG. 5 the body 50 is shown mounted in a static panel 51. The panel 51 is provided with an opening 52 which extends through the entire thickness thereof. The opening 52 is tapered from the surface 53 to a minimum diameter at the throat 54 of the opening, and the opening is provided with a uniform diameter section 55, somewhat larger than the throat 54 as is clearly evident in the drawing. The body 50 is composed of a tapered female receptacle 56 whose taper is substantially identical to the taper of the opening.

A groove 57 is formed in the body 50 at its narrower end in the bore 55, and the groove 57 supports a disc or ring 58 permanently positioned therein. The disc 58 and the shoulder 59 at the throat 54 together define a cavity 60 within which is disposed spring 61. The spring 61 bears against the shoulder 59 and ring 58 and acts in compression to draw the body 50 into the opening so that the tapered section of the opening bears against the sides of the body to restrict the size of the recess 62 provided as a receiver of a male probe, in accordance with the other embodiments of this invention. It will be noted that the body is provided with at least one longitudinally extending groove which allows the female receptacle to be compressed so as to reduce the diameter of the recess 62.

The larger end of the body 50 carries a flange 63 that lies outwardly of the surface 53 of the panel in which the body is mounted. The flange provides a ready means for engaging the body 50 and moving it against the bias of the spring 61 to the right as viewed in FIG. 5 so as to prevent the tapered margins of the opening 52 from bearing against the body and restricting the diameter of the recess 62. Thus, when a male probe is to be inserted in the opening 62 and clamped in place, the user first engages the flange 63 to move the body 50 against the bias of spring 61 so as to enable the body to expand and the recess 62 to enlarge. When in that condition the male probe is inserted into the recess and the body is then released to the influence of spring 61. The spring withdraws the body into the recess 52 and causes it to be compressed by the recess and firmly engage the probe.

The embodiments shown in FIGS. 6-11 differ from the embodiments described above in that the female receptacle is not made of a molded, cast or machined body from relatively rigid material, but rather is of a less permanent configuration in that each is composed of a form made from specially looped wire. Although the bodies of the female receptacles shown in FIGS. 6-11 bear this distinction, they nevertheless work on the same principle as the other embodiments. In the embodiment of FIG. 6 the receptacle is made of spring wire which may be flat or circular in cross section. The wire 70 is provided with two loops 71 and 72 connected together by the intermediate length of spring material 73, and the two loops are shown in FIG. 7 to form effectively a U-shaped receptacle with the base of the U defined by the length of spring 73. The ends of the loops 71 and 72 are flared outwardly somewhat as suggested at 74, and these flared ends are designed to cooperate with the enlarged section 75 at the inner end of the tapered opening 76 in the panel 77 in which the connection is to be made. Thus, when the female connector shown in FIG. 7 is inserted deeper into the tapered opening 76 in the panel 77 the two loops 71 and 72 close about a male probe, and when the ears 74 reach the enlarged section 75 the connector formed of the spring wire will releasably grasp the probe. To move the connector deeper into the opening 76 the end of the male probe with which the connection is to be made may be pressed against the portion 73 of the wire and force the entire female connector deeper into the opening.

The embodiment shown in FIG. 8 is somewhat more complex than the embodiment of FIG. 6, but functions in the same manner. Thus, the connector 80 is composed of four wire loops 81-84 with the wire loops 81 and 82 lying on one side and the loops 83 and 84 on the other to form the U-shaped configuration shown in FIG. 10. One or both loops on each side of the U may be bent outwardly as suggested at 86 to cooperate with the enlarged section 75 in the panel opening 76 to lock the female receptacle in place when a probe is disposed between the loops.

The female connector 90 as shown in FIG. 9 also includes four loops 91-94 with the loops 91 and 93 lying on one side and the loops 92 and 94 on the other. The loops are joined to one another by three cross lengths 96-98, and the cross lengths define the base of the U-shaped clamping portion of the female receptacle. In FIGS. 9 and 11 it will be noted that the loops 93 and 94 are shorter than the other loops and they flare outwardly at a more pronounced angle than the flare provided in the opening 76 in the panel 77. Thus, when a male probe pushes against one or more of the cross lengths 76-78 at the base of the U-shaped receptacle and moves the receptacle further into the opening 76, the ends of the loops 93 and 94 will ultimately reach the enlarged chamber 75 formed in the opening to releasably lock the female receptacle in place in the panel and in engagement with the male probe.

The embodiment of FIG. 12 is similar to the embodiments of FIGS. 1 and 4. Thus, the body 100 of the electrical connector includes a female end 102 and a male probe 104, and the extremes of the female portion of the body are defined by flanges 103 and 105. The female receptacle end 102 of the body has a minimum diameter adjacent the flange 103; is somewhat larger in diameter adjacent the flange 105; and has a maximum diameter at the waist 106. A coil spring 107 is wound about the female receptacle 102 of the body between the flange 105 and the waist 106. The spring 107 may cooperate with the static panel in which the receptacle is mounted to urge the body 100 deeper into the panel as suggested in the drawing so that the margins of the opening 108 within which the body is disposed bear against the tapered sides of the female portion 102 so as to reduce the diameter of the recess 109. It will be noted that the female portion 102 of the body has longitudinally extending slots to enable the forces applied to the body to produce a yielding of the recess walls to achieve the reduction in recess diameter.

In FIGS. 13–15 three minor variations of the receptacle are suggested, all of which enable a single receptacle to receive a plurality of male probes. Each of FIGS. 13–15 is an end view of a female receptacle which may take any form; that is, it may bear the configuration of the units of FIGS. 1, 3, 4, or 12. In FIG. 13, the female receptacle 110 is provided with four longitudinally extending slots 111 each of which is interrupted radially by a recess 112. In addition, a fifth recess 113 is shown disposed in the center of the body where the four slots 111 meet one another. When the body is compressed by a spring or the margins of an opening in a static panel, the recesses 112 and 113 will be reduced in diameter so as to engage a probe or probes inserted in them.

In the embodiment of FIG. 14 the body 115 is provided with two radially extending slots 116, each interrupted by a recess 117. In the embodiment of FIG. 15 the body 118 is also provided with two radial slots and three recesses 119 are provided, each capable of receiving one probe. It is to be understood that in each of the embodiments of FIGS. 13–15 it is unnecessary to use each of the recesses provided in order to use the female receptacle effectively. That is, the nonuse of one or more of the recesses does not adversely effect the use of the other recesses in the bodies.

From the foregoing description those skilled in the art will appreciate that numerous modifications may be made of this invention without departing from its spirit. Therefore, it is not intended that the breadth of this invention be limited to the specific embodiments illustrated and described herein. Rather, it is intended that the breadth of this invention be determined by the appended claims and their equivalents.

What is claimed is:
1. An electrical connector comprising
a body having collapsible side walls which define a female receptacle, said walls having outer surfaces which diverge in the direction of the inlet end of the receptacle,
a static panel surrounding the body and having interior walls which diverge in the same direction and at the same angle as the walls of the body,
an enlarged cavity in the panel surrounding a portion of the body and forming with the body an annular chamber,
a member projecting outwardly from the body within the chamber,
a spring disposed within the chamber and bearing against the member and urging the body inwardly in the direction of its smaller end for causing the interior walls of the panel to compress the walls of the body to reduce the diameter of the female receptacle,
and a shoulder formed on the body and bearing against the panel for limiting the movement of the body in the direction of its smaller end.

2. An electrical connector comprising
a body having collapsible side walls which define a female receptacle, said walls having outer surfaces which diverge in the direction of the inlet end of the receptacle,
a fixed panel having an opening therethrough through which the body extends,
a portion of said opening being cylindrical in shape and another portion of said opening being defined by interior walls which diverge in the same direction and at the same angle as the walls of the body,
a spring disposed in the cylindrical portion of the opening and surrounding a portion of the body and engaging the body for urging it in the direction of its smaller end and thereby causing the interior walls of the opening to compress the walls of the body to reduce the diameter of the female receptacle,
and means limiting the relative movement of the body and the panel to limit the compressive force applied to the body.

References Cited by the Examiner

UNITED STATES PATENTS

| 368,149 | 8/1887 | Higgins | 339—276 |
| 1,165,273 | 12/1915 | Miller | 339—273 |
| 2,959,766 | 11/1960 | Jacobsen | 339—276 X |

FOREIGN PATENTS

| 816,650 | 5/1937 | France. |
| 882,790 | 3/1943 | France. |

JOSEPH D. SEERS, *Primary Examiner.*